United States Patent
Hur et al.

(10) Patent No.: US 11,141,688 B2
(45) Date of Patent: Oct. 12, 2021

(54) AIR CLEANING SYSTEM AND METHOD FOR CONTROLLING THE SAME

(71) Applicant: Samsung Electronics Co., Ltd., Suwon-si (KR)

(72) Inventors: Jae Hun Hur, Yongin-si (KR); Jae Kwon Ko, Uiwang-si (KR); Han Taek Kwak, Suwon-si (KR); Min Gyu Kim, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 155 days.

(21) Appl. No.: 16/171,788

(22) Filed: Oct. 26, 2018

(65) Prior Publication Data

US 2019/0232210 A1 Aug. 1, 2019

(30) Foreign Application Priority Data

Jan. 31, 2018 (KR) .......................... 10-2018-0012188

(51) Int. Cl.
*B01D 46/44* (2006.01)
*F24F 8/10* (2021.01)
(Continued)

(52) U.S. Cl.
CPC ....... *B01D 46/442* (2013.01); *B01D 46/0019* (2013.01); *B01D 46/0043* (2013.01);
(Continued)

(58) Field of Classification Search
CPC .............. B01D 46/442; B01D 46/0019; B01D 46/0043; B01D 46/0086; B01D 2279/51;
(Continued)

(56) References Cited

U.S. PATENT DOCUMENTS

| 6,093,229 A | 7/2000 | Lee et al. |
| 2005/0172816 A1 | 8/2005 | Son et al. |
| 2017/0097163 A1* | 4/2017 | Law .................. B01D 46/4263 |

FOREIGN PATENT DOCUMENTS

| CN | 1651827 A | 8/2005 |
| CN | 104019924 A | 9/2014 |

(Continued)

OTHER PUBLICATIONS

International Search Report and Written Opinion of the International Searching Authority dated May 24, 2019 in International Patent Application No. PCT/KR2019/000707.

(Continued)

*Primary Examiner* — Robert Clemente
(74) *Attorney, Agent, or Firm* — Staas & Halsey LLP

(57) ABSTRACT

An air cleaning system having at least one dust sensor and a method for controlling the air cleaning system may improve accuracy of dust sensors through linkage control of the dust sensors, and may normally operate a faulty air cleaner using dust sensors of the remaining communicating air cleaners other than the faulty air cleaner even when any one of the dust sensors fails to operate. The air cleaning system may select a master dust sensor through linkage control of the dust sensors, and may operate the plurality of air cleaners only using sensor information of the master dust sensor. Therefore, the air cleaning system may stop operation of the remaining dust sensors other than the master dust sensor, may reduce measurement noise produced by the dust sensors and power consumption, and may increase a lifetime of the dust sensors.

13 Claims, 18 Drawing Sheets

(51) Int. Cl.
*B01D 46/00* (2006.01)
*F24F 11/38* (2018.01)
*F24F 110/50* (2018.01)

(52) U.S. Cl.
CPC ............ *B01D 46/0086* (2013.01); *F24F 8/10* (2021.01); *F24F 11/38* (2018.01); *B01D 2279/51* (2013.01); *F24F 2110/50* (2018.01)

(58) Field of Classification Search
CPC .. F24F 11/38; F24F 3/16; F24F 3/1603; F24F 2003/1614; F24F 2110/50; F24F 8/10; F24F 8/108
See application file for complete search history.

(56) References Cited

FOREIGN PATENT DOCUMENTS

| | | |
|---|---|---|
| CN | 106196506 A | 12/2016 |
| JP | 2002-310490 | 10/2002 |
| JP | 2016-201757 | 12/2016 |
| KR | 10-2006-0026319 A | 3/2006 |
| KR | 10-2009-0017007 | 2/2009 |
| KR | 10-2010-0019824 A | 2/2010 |
| KR | 10-2012-0108625 | 10/2012 |
| KR | 10-2014-0009775 A | 1/2014 |
| KR | 10-2016-0047438 | 5/2016 |
| KR | 10-2017-0122043 | 11/2017 |
| WO | WO 2016/097385 A1 | 6/2016 |

OTHER PUBLICATIONS

Extended European Search Report dated Jan. 29, 2021, in European Application No. 19747075.0.
Chinese First Office Action for Chinese Application No. 201811608964.9 dated Jul. 5, 2021.

* cited by examiner

AIR CLEANING SYSTEM AND METHOD FOR CONTROLLING THE SAME

CROSS-REFERENCE TO RELATED APPLICATIONS

This application is based on and claims priority under 35 U.S.C. § 119 to Korean Patent Application No. 10-2018-0012188, filed on Jan. 31, 2018 in the Korean Intellectual Property Office, the disclosure of which is incorporated by reference in its entirety.

BACKGROUND

1. Field

The following description relates to an air cleaning system and a method for controlling the same.

2. Description of the Related Art

As an increasing number of people spend most of their time indoors such as in houses or offices, the demand for a comfortable indoor environment rises, such that the demand for air cleaners capable of improving the air quality of indoor spaces is rapidly increasing.

The air cleaner cleans contaminants in the air, converts the air into fresh air, includes dust sensors to measure air pollution, and can be installed in various indoor spaces. Indoor space may be relatively large or small in size. As a result, air cleaners having various capacities have recently been developed and introduced to the market, and a user may select a desired air cleaner having suitable capacity from among various kinds of air cleaners in consideration of indoor spaces to be used for installation of the air cleaner.

Meanwhile, because only one air cleaner installed in a complex indoor space, such as housing, cannot sufficiently improve the air quality in the complex indoor space, the number of users who desire to install a plurality of air cleaners in the same space is rapidly increasing.

When the plurality of air cleaners are installed in the same space, the respective air cleaners are configured to independently measure the air pollution level, such that all the dust sensors installed in the respective air cleaners may be operated at the same time. Therefore, because measurement noise produced during operation of the dust sensors occurs in all the air cleaners, the measurement noise may increase. In addition, a use time of the dust sensors is identical in length to an operation time of the air cleaner, resulting in reduction of a lifetime of the dust sensors.

Because the dust sensors in the air cleaner have a higher error rate as compared to other sensors, the dust sensors installed in the same space may unavoidably display different measurement values, resulting in customer complaints. In addition, air cleaning efficiency may decrease due to incorrect measurement values.

If any one of the dust sensors respectively installed in the plurality of air cleaners is faulty, it is impossible for the air cleaner having the faulty dust sensor to normally operate using the dust sensor.

SUMMARY

Therefore, it is an aspect of the present disclosure to provide an air cleaning system capable of controlling linkage of dust sensors embedded in a plurality of air cleaners installed in the same space, and a method for controlling the same.

Additional aspects of the disclosure will be set forth in part in the description which follows and, in part, will be obvious from the description, or may be learned by practice of the disclosure.

In accordance with an aspect of the present disclosure, an air cleaning system includes: a plurality of air cleaners, each having a dust sensor to measure the degree of air pollution, installed in the same space; and a controller configured to link-control the dust sensors respectively embedded in the plurality of air cleaners, wherein the plurality of air cleaners are connected to each other through network communication, and share their own dust sensor information with each other through the network communication.

The controller may control the plurality of air cleaners based on dust measurement values measured by the dust sensors.

The controller may compare the dust measurement values of the dust sensors respectively embedded in the plurality of air cleaners with each other, and may thus determine occurrence or non-occurrence of a faulty state in any of the dust sensors.

The controller may calculate a sensor average value of the dust measurement values, and may determine a dust sensor having a dust measurement value that is not present in an allowable range (M) from the sensor average value, to be a faulty sensor.

The controller may calculate an average value of the remaining valid sensors other than the faulty sensor, and may apply a deviation between the average value of the valid sensors and a dust measurement value of each valid sensor to a correction value of the valid sensors.

The controller may select either a sensor having the shortest usage time or a sensor having a dust measurement value located closest to the average value of the valid sensors as a master sensor.

The controller may stop operation of the remaining dust sensors other than the master sensor, and may operate the plurality of air cleaners only using the dust measurement value of the master sensor.

When the dust sensor embedded in any one of the plurality of air cleaners normally operates, the controller may select the corresponding dust sensor as the master sensor, and may operate the plurality of air cleaners using the master sensor.

The controller may decide the size of an indoor space including the plurality of air cleaners, may estimate a dust occurrence event on the basis of the decided size of the indoor space, and may increase the amount of purified air.

The controller may decide the size of the indoor space not only using an initial dust measurement value in a state of non-introduction of outdoor sir, but also using a dust measurement value after lapse of a predetermined time from an acquisition time of the initial dust measurement value.

When dust measurement values of some dust sensors deviate from the allowable range (M) of the average value on the basis of the decided size of the space, the controller may decide occurrence of the dust occurrence event, and may increase the amount of purified air to a dust measurement value higher than actual dust measurement values of the valid sensors.

The controller may receive dust forecast data from an external server, compares the received dust forecast data with a variance of the dust measurement values of the dust sensors, and may determine whether an indoor space interacts with outdoor air.

When the indoor space interacts with the outdoor air, the controller may increase the amount of purified air by adding a compensation value to the actual dust measurement values of the dust sensors.

In accordance with an aspect of the present disclosure, a method for controlling an air cleaning system which includes a plurality of air cleaners, each of which has a dust sensor to measure the degree of air pollution and a display to display a dust measurement value measured by the dust sensor, installed in the same space, and performs grouping control of the dust sensors respectively embedded in the plurality of air cleaners, the method includes: determining occurrence or non-occurrence of a faulty state in the dust sensors by comparing dust measurement values measured by the dust sensors with each other; selecting a master sensor from among the remaining dust sensors not staying in the faulty state; and link-displaying a dust measurement value measured by the master sensor on the displays respectively embedded in the plurality of air cleaners.

In accordance with an aspect of the present disclosure, a method for controlling an air cleaning system which includes a plurality of air cleaners, each of which has a dust sensor to measure the degree of air pollution, installed in the same space, wherein the air cleaners are connected through network communication to share dust sensor information with each other, the method includes: grouping dust sensors respectively embedded in the plurality of air cleaners; determining occurrence or non-occurrence of a faulty state in the dust sensors by comparing dust measurement values of the grouped dust sensors with each other; selecting a master sensor from among the remaining valid sensors not staying in the faulty state; and link-controlling the plurality of air cleaners using a dust measurement value of the master sensor.

The determining the occurrence or non-occurrence of the faulty state may further include: calculating a sensor average value of the dust measurement values; and determining a dust sensor having a dust measurement value that is not present in an allowable range (M) from the sensor average value, to be a faulty sensor.

The selecting the master sensor may include: selecting, from among the valid sensors other than the faulty sensor, either a sensor having the shortest usage time or a sensor having a dust measurement value located closest to an average value of the valid sensors, as a master sensor.

The method may further include: increasing the amount of purified air by estimating a dust occurrence event of the indoor space including the plurality of air cleaners.

The estimating the dust occurrence event may include: when dust measurement values of the dust sensors deviate from the allowable range (M) of the average value, determining occurrence of the dust occurrence event, and increasing the amount of purified air to a dust measurement value higher than actual dust measurement values of the valid sensors.

The method may further include: receiving dust forecast data from an external server; comparing the received dust forecast data with a variance of the dust measurement values measured by the dust sensors; and when the variance of the dust measurement values follows the dust forecast data, increasing the amount of purified air by adding a compensation value to the actual dust measurement values of the dust sensors.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
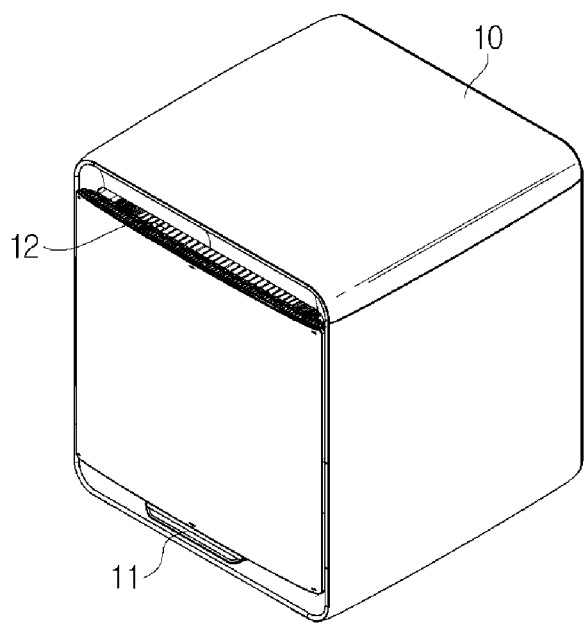
FIG. 1 is a perspective view illustrating the appearance of an air cleaner according to an embodiment of the present disclosure.

Reference will now be made in detail to the embodiments of the present disclosure, examples of which are illustrated in the accompanying drawings, wherein like reference numerals refer to like elements throughout.

The terms used in the present application are merely used to describe specific embodiments and are not intended to limit the present disclosure. A singular expression may include a plural expression unless otherwise stated in the context. In the present application, the terms "including" or "having" are used to indicate that features, numbers, steps, operations, components, parts or combinations thereof described in the present specification are present and presence or addition of one or more other features, numbers, steps, operations, components, parts or combinations is not excluded.

In description of the present disclosure, the terms "first" and "second" may be used to describe various components, but the components are not limited by the terms. The terms may be used to distinguish one component from another component. For example, a first component may be called a second component and a second component may be called a first component without departing from the scope of the present disclosure. The term "and/or" may include a combination of a plurality of items or any one of a plurality of items.

An air cleaner according to embodiments of the present disclosure will hereinafter be described with reference to the attached drawings.

FIG. 1 is a perspective view illustrating the appearance of an air cleaner according to an embodiment of the present disclosure.

Referring to FIG. 1, the air cleaner 1 may include a modular body 10 for forming the external appearance thereof.

The body 10 may include an air inlet 11 through which outdoor air is suctioned into the body 10, and an air outlet 12 through which the air suctioned through the air inlet 11 is discharged outside. The air inlet 11 and the air outlet 12 may be formed on the same surface of the body 10, or may be formed at different surfaces of the body 10. For example, the air inlet 11 may be formed at a rear surface of the body 10, and the air outlet 12 may be formed at a front surface of the body 10.

A filter unit (not shown) and a blowing fan 150 (see FIG. 7) may be installed in the body 10. The blowing fan 150 may allow indoor air to be suctioned into the body 10 through the air inlet 11, may filter out dirt or dust from the suctioned air through the filter unit, and may discharge purified air to the outside of the body 10 through the air outlet 12. The filter unit may purify the air suctioned through the air inlet 11, and may be detachably coupled to the body 10.

The body 10 may include a dust sensor 110 (see FIG. 7) for measuring concentration of dust in the air (i.e., the degree of air pollution), and a controller 120 (see FIG. 7) for controlling the air cleaner 1.

According to the size of indoor spaces, the air cleaner 1 may be used independently or a plurality of air cleaners 1 may be used in combination. A detailed description thereof will hereinafter be described with reference to FIGS. 2 and 3.

Figure 2:
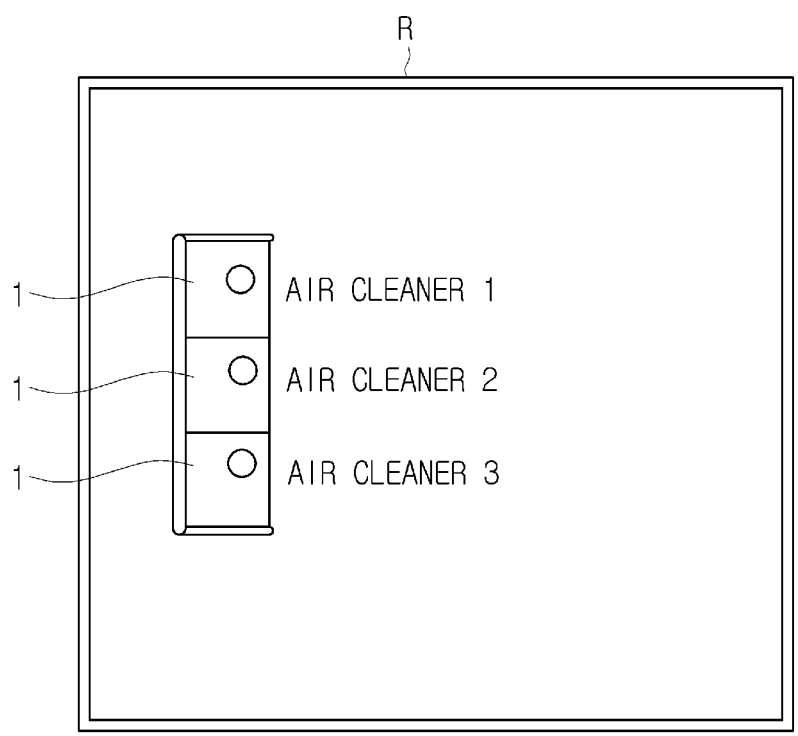
FIG. 2 is a first exemplary view illustrating a plurality of air cleaners installed in the same space according to an embodiment of the present disclosure.
Figure 3:
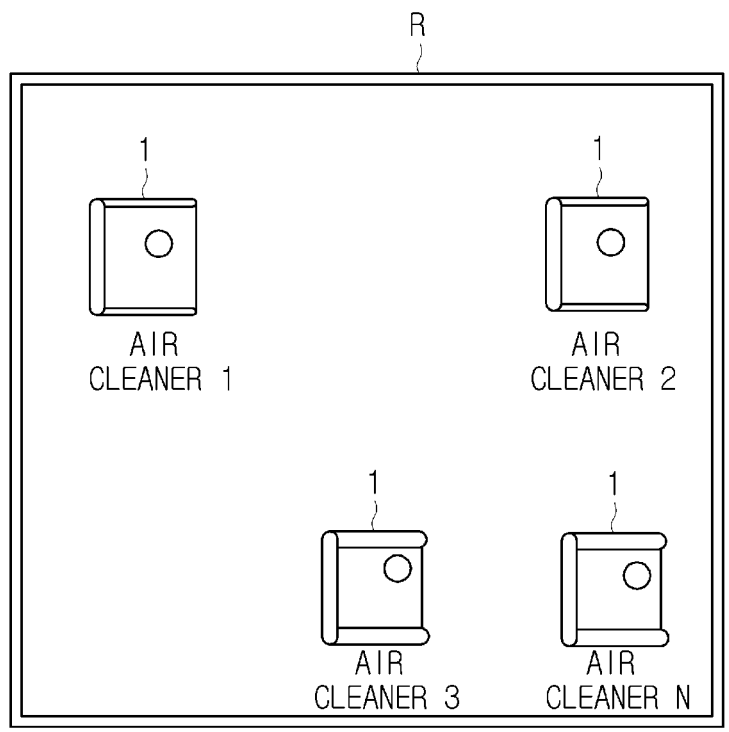
FIG. 3 is a second exemplary view illustrating a plurality of air cleaners installed in the same space according to an embodiment of the present disclosure.

FIG. 2 is a first exemplary view illustrating a plurality of air cleaners installed in the same space according to an embodiment of the present disclosure. FIG. 3 is a second exemplary view illustrating a plurality of air cleaners installed in the same space according to an embodiment of the present disclosure.

Referring to FIGS. 2 and 3, when a plurality of air cleaners 1 are used in the same indoor space R, the plurality of air cleaners 1 (Air Cleaner 1, Air Cleaner 2, Air Cleaner 3, . . . Air Cleaner N) may be installed in a stacked manner, or the plurality of air cleaners 1 (Air Cleaner 1, Air Cleaner 2, Air Cleaner 3, . . . Air Cleaner N) may be installed separately from one another as necessary.

The plurality of air cleaners 1 (Air Cleaner 1, Air Cleaner 2, Air Cleaner 3, . . . Air Cleaner N) installed in the same space R may communicate with one another through a network. A detailed description thereof will hereinafter be described with reference to FIGS. 4 and 5.

Figure 4:
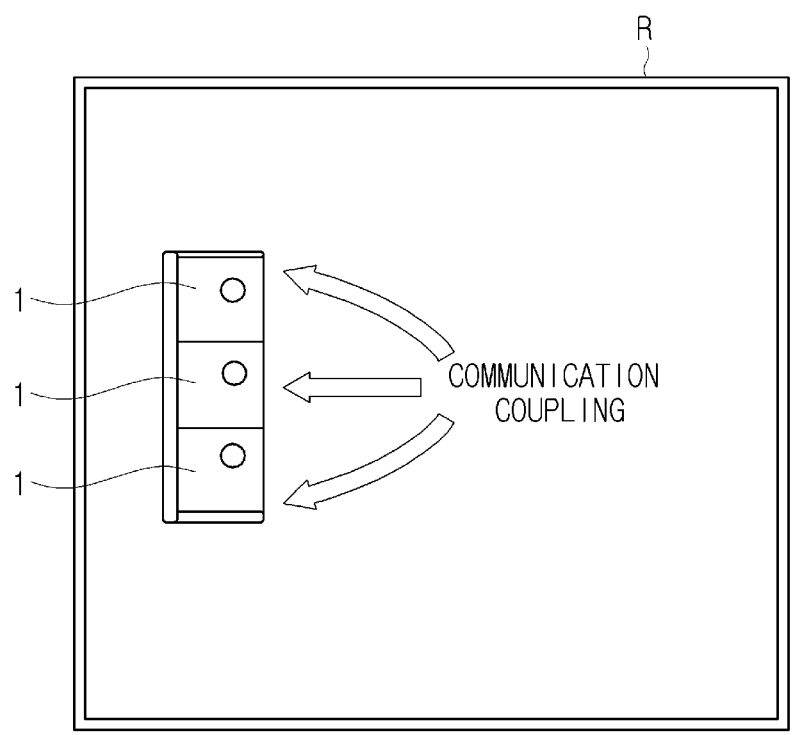
FIG. 4 is a view illustrating a communication connection state of the plurality of air cleaners shown in FIG. 2.
Figure 5:
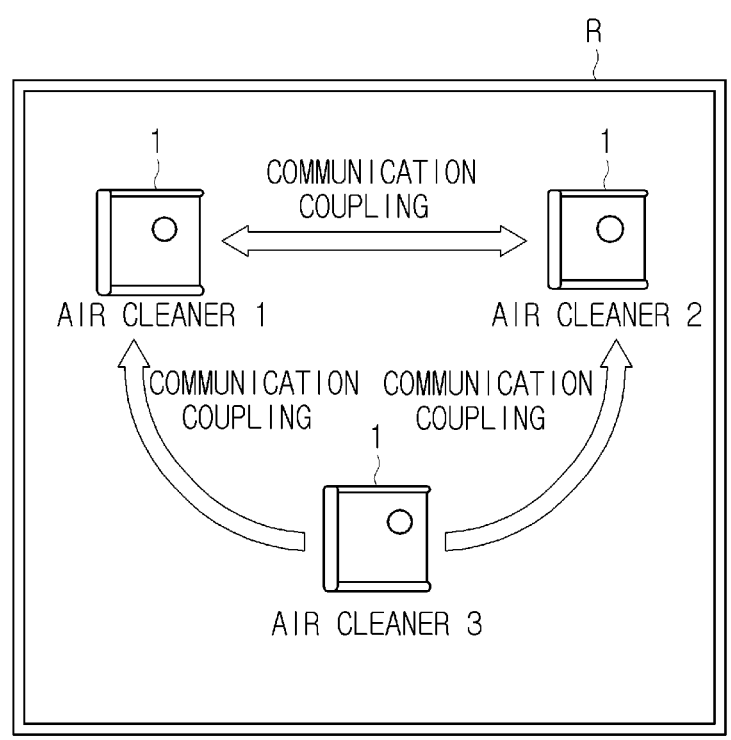
FIG. 5 is a view illustrating a communication connection state of the plurality of air cleaners shown in FIG. 3.

FIG. 4 is a view illustrating a communication connection state of the plurality of air cleaners shown in FIG. 2. FIG. 5 is a view illustrating a communication connection state of the plurality of air cleaners shown in FIG. 3.

Referring to FIGS. 4 and 5, the plurality of air cleaners 1 (Air Cleaner 1, Air Cleaner 2, Air Cleaner 3, . . . Air Cleaner N) may communicate with one another through the network.

The plurality of air cleaners 1 (Air Cleaner 1, Air Cleaner 2, Air Cleaner 3, . . . Air Cleaner N) communicating with one another through the network may share information acquired from dust sensors embedded in the respective air cleaners 1 with one another. An air cleaning system 100 capable of collectively link-controlling dust sensors 110 respectively embedded in the air cleaners 1 (Air Cleaner 1, Air Cleaner 2, Air Cleaner 3, . . . Air Cleaner N) through linkage control of the dust sensors 110 may be configured. The air cleaning system 100 will hereinafter be described with reference to FIG. 6.

Figure 6:
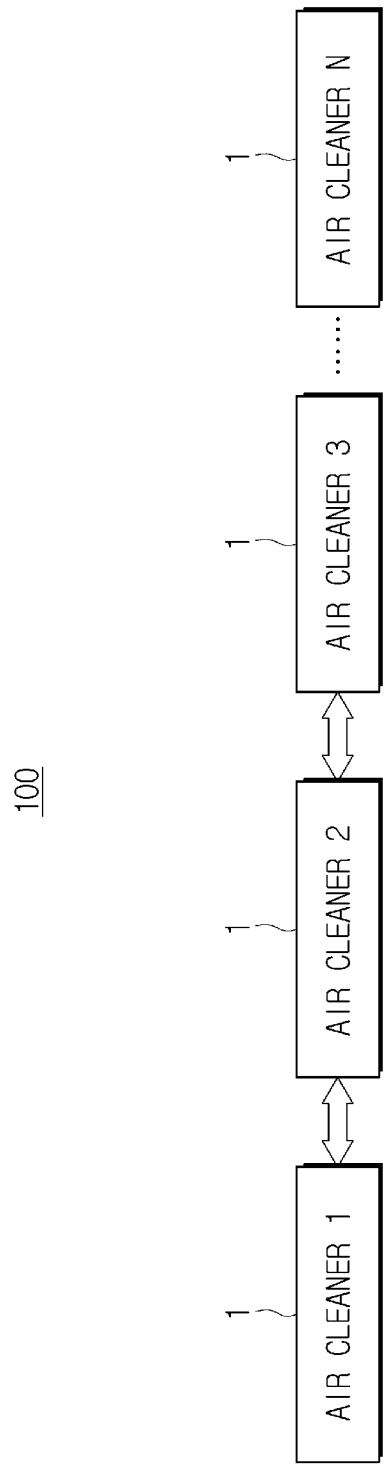
FIG. 6 is a conceptual diagram illustrating overall connection of an air cleaning system according to an embodiment of the present disclosure.

FIG. 6 is a conceptual diagram illustrating overall connection of an air cleaning system according to an embodiment of the present disclosure.

Referring to FIG. 6, the air cleaning system 100 may include a plurality of air cleaners 1 (Air Cleaner 1, Air Cleaner 2, Air Cleaner 3, . . . Air Cleaner N). The plurality of air cleaners 1 (Air Cleaner 1, Air Cleaner 2, Air Cleaner 3, . . . Air Cleaner N) may be installed in the same space R or in different indoor spaces.

The air cleaning system 100 may collectively control the dust sensors 110 respectively embedded in the air cleaners 1 (Air Cleaner 1, Air Cleaner 2, Air Cleaner 3, . . . Air Cleaner N), such that the air cleaning system 100 may correct errors of the dust sensors 110 and may sequentially control the dust sensors 110.

Figure 7:
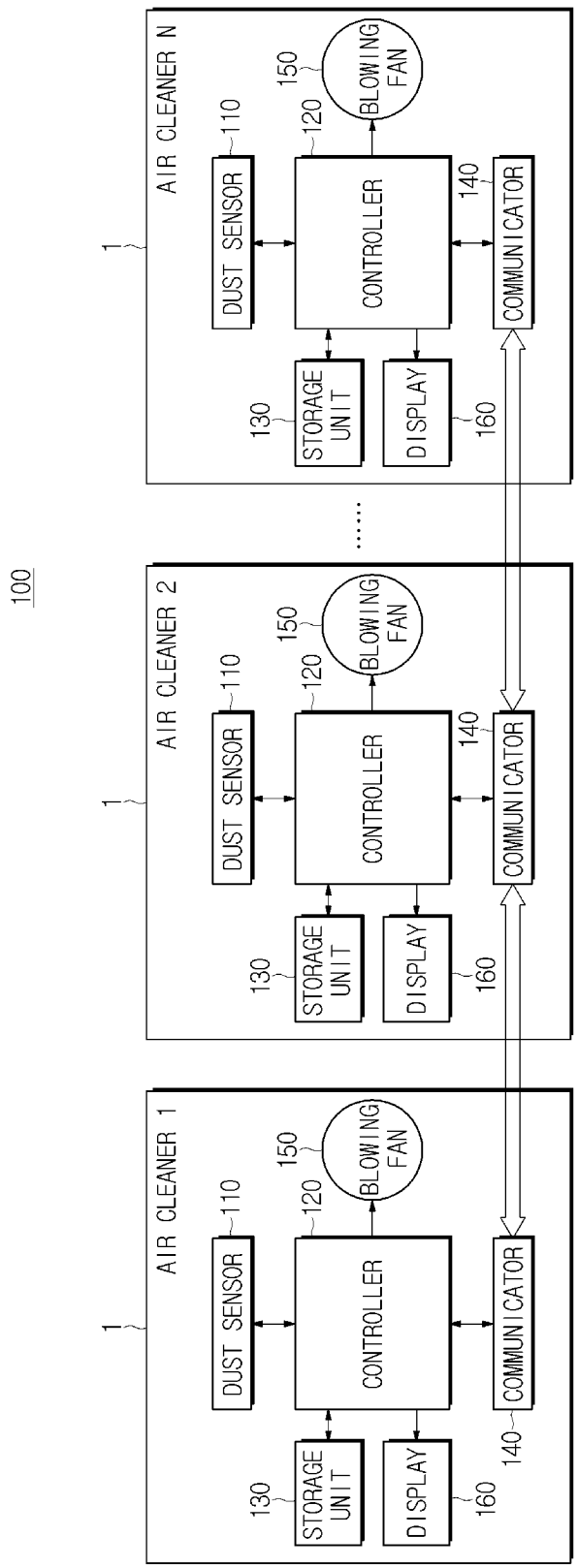
FIG. 7 is a detailed control block diagram illustrating an air cleaning system according to an embodiment of the present disclosure.

FIG. 7 is a detailed control block diagram illustrating the air cleaning system according to an embodiment of the present disclosure.

Referring to FIG. 7, the air cleaning system 100 may include a dust sensor 110, a controller 120, a storage unit 130, a communicator 140, a blowing fan 150, and a display 160 in each of the air cleaners 1 (Air Cleaner 1, Air Cleaner 2, . . . Air Cleaner N).

The dust sensors 110 may measure the air quality of an indoor space R including the air cleaners 1 (Air Cleaner 1, Air Cleaner 2, . . . Air Cleaner N), may measure concentration of dust (i.e., the degree of air pollution) in the air suctioned into the body 10 through the air inlet 11, and may transmit the dust measurement value to the controller 120.

Although the embodiment of the present disclosure has exemplarily disclosed an air cleaner equipped with the dust sensor 110 for measuring concentration of dust in the air, the scope or spirit of the present disclosure is not limited thereto, and the embodiment may further include various kinds of sensors for measuring a state of the air, such as a gas sensor (VOC sensor) for measuring the concentration of gas in the air, a $CO_2$ sensor for measuring the concentration of $CO_2$ in the air, a radon (Rn) sensor for measuring concentration of radon (Rn) in the air, a humidity sensor for measuring humidity in the air, and a temperature sensor for measuring a temperature of the air, for example.

The controller 120 may be a microprocessor for controlling overall operation of the air cleaning system 100, may receive the degree of air pollution (i.e., a dust measurement value) in the indoor space from the dust sensor 110, and may collectively control the plurality of air cleaners 1 (Air Cleaner 1, Air Cleaner 2, . . . Air Cleaner N) on the basis of the dust measurement value.

For example, the controller 120 may link-control the plurality of air cleaners 1 (Air Cleaner 1, Air Cleaner 2, . . . Air Cleaner N) communicating with one another on the basis of the dust measurement value measured by the dust sensor 110.

In an example, the controller 120 may receive a dust measurement value from at least one of the air cleaners 1 (Air Cleaner 1, Air Cleaner 2, . . . Air Cleaner N) through the communicator 140, and may also link-control the plurality of air cleaners 1 (Air Cleaner 1, Air Cleaner 2, . . . Air Cleaner N) on the basis of the received dust measurement value.

In an example, the controller 120 may group-control the plurality of air cleaners 1 (Air Cleaner 1, Air Cleaner 2, . . . Air Cleaner N) on the basis of either the dust measurement value measured by the dust sensor 110 or the other dust measurement value received from at least one of the air cleaners 1 (Air Cleaner 1, Air Cleaner 2, . . . Air Cleaner N) through the communicator 140. For example, the air cleaners 1 (Air Cleaner 1, Air Cleaner 2, . . . Air Cleaner N) connected through communication may be grouped into a plurality of groups (for example, a living room, a kitchen, offices per floor, etc.). The controller 120 may link-control the plurality of air cleaners 1 (Air Cleaner 1, Air Cleaner 2, . . . Air Cleaner N) belonging to each group on the basis of the dust measurement value. Therefore, the controller 120 may determine the presence or absence of sensor validity of the linked air cleaners 1 (Air Cleaner 1, Air Cleaner 2, . . . Air Cleaner N) using dust sensor information collected by the respective air cleaners 1 (Air Cleaner 1, Air Cleaner 2, . . . Air Cleaner N), and may select a master dust sensor.

In an example, the controller 120 may receive dust forecast data from an external server (not shown) through the communicator 140, and may control the blowing fan 150 on the basis of the received dust forecast data. For example, the controller 120 may determine whether the indoor space R interacts with outdoor air on the basis of the result of comparison between a dust forecast state and a variance in data measured by the dust sensor 110. If a current environment to be measured is an environment interacting with outdoor air, the controller 120 may increase the amount of air cleaning according to a dust forecast, such that the controller 120 may actively prevent the spread of dust in the indoor space.

The controller 120 for collectively controlling the dust sensors 110 of the plurality of air cleaners 1 (Air Cleaner 1, Air Cleaner 2, . . . Air Cleaner N) will hereinafter be described with reference to FIGS. 8 to 17.

The controller 120 may be implemented using a device capable of various calculations and control operations. For example, the controller 120 may be implemented using a Central Processing Unit (CPU), a microprocessor (Micom), a Micro Controller Unit (MCU), etc. The controller 120 may also be implemented using at least one semiconductor chip or associated devices including the at least one semiconductor chip.

In accordance with an embodiment, the controller 120 may be implemented using a universal processing device. In this case, the controller 120 may also perform necessary calculation and control operations by driving a program stored in the storage unit. The program stored in the storage unit 130 may be stored by a designer or may be received from an external server device connectable through a separate communication network. For example, the program may be received through an electronic software distribution (ESD) network. In addition, the controller 120 may also be implemented using a processing device that is programmed to perform a specific operation in advance by the designer.

The storage unit 130 may store dust sensor information of the corresponding air cleaner 1 (any of Air Cleaner 1, Air Cleaner 2, . . . Air Cleaner N), and may store dust sensor information of another air cleaner 1 (another of Air Cleaner 1, Air Cleaner 2, . . . Air Cleaner N). That is, the storage unit 130 may store the dust measurement value measured by the dust sensor 110 of the corresponding air cleaner 1 (for example, Air Cleaner 1), and may also store the dust measurement value that has received from the dust sensor 110 of another air cleaner 1 (for example, Air Cleaner 2, . . . Air Cleaner N) through the communicator 140.

The storage unit 130 may store real-time-updated sensor information of all the air cleaners 1 (Air Cleaner 1, Air Cleaner 2, . . . Air Cleaner N), the number of corrections of the corrected dust measurement values, the accumulated usage time of the dust sensor, a faulty state based on sensor diagnosis, information of a master dust sensor selected as a master by integrated control, etc. In this case, sensor information stored in the storage unit 130 may share all the air cleaners 1 (Air Cleaner 1, Air Cleaner 2, . . . Air Cleaner N) with one another through communication.

The storage unit 130 may store control program and control data needed to control the air cleaners 1, and various application programs and application data needed to perform various functions based on user input signals. For example, the storage unit 130 may store an Operating System (OS) program for managing structures and resources (software and hardware) contained in each air cleaner 1, and a calendar application for managing a schedule, etc.

The storage unit 130 may store setting information (e.g., reference data used during operation control of the air cleaners 1, operation data used during a specific operation of the air cleaners 1, setting data entered to allow the air cleaners 1 to perform a specific operation, etc.), usage information (e.g., the number of specific operations executed by the air cleaners 1, model information of the air cleaners 1, etc.), and faulty information (e.g., the reason or position of a fault during malfunction of the air cleaners 1).

The storage unit 130 may be implemented as magnetic disc storage media, magnetic drum media, or semiconductor storage media. For example, the semiconductor storage media may include a volatile memory, such as a Static Random Access memory (SRAM) or Dynamic Random Access Memory (DRAM), or may include a non-volatile memory, such as a Read Only Memory (ROM), an Erasable Programmable Read Only Memory (EPROM), an Electrically Erasable Programmable Read Only Memory (EEPROM), a flash memory, or the like. However, the storage unit 130 is not limited thereto and may also be implemented as any other storage devices known to those skilled in the art.

Although the controller 120 and the storage unit 130 have been functionally distinguished from each other for convenience of description, it should be noted that the controller 120 and the storage unit 130 are not always physically distinguished from each other. For example, the controller 120 and the storage unit 130 may be implemented in different chips, or may be implemented as a single chip as necessary.

The communicator 140 may be connected to the controller 120, and may be configured to communicate with another air cleaner 1 (at least one of Air Cleaner 1, Air Cleaner 2, . . . Air Cleaner N).

The communicator 140 may be a communication module for supporting that dust sensor information is communicated between the plurality of air cleaners 1 (Air Cleaner 1, Air Cleaner 2, . . . Air Cleaner N), such that the air cleaners 1 (Air Cleaner 1, Air Cleaner 2, . . . Air Cleaner N) are connected to one another over the network. For example, the communicator 140 may include a Wireless Fidelity (Wi-Fi) communication module to connect to a local area network (LAN) through an access point (AP) or the like, a Bluetooth communication module to communicate with a single external device on a one-to-one basis or to communicate with a small number of external devices on a one-to-multiple basis, and a broadcast signal reception (Rx) module to receive a digital broadcast signal.

The communicator 140 may also be connected to other devices using any one of GSM/3GPP-based schemes (GSM, HSDPA, LTE Advanced, etc.), 3GPP2-based schemes (such as CDMA), or WiMAX-based communication schemes.

The communicator 140 may be connected to other devices so that information can be communicated between the communicator 140 and the other devices. In more detail, the communicator 140 may be connected to a mobile terminal located near the air cleaners 1 or a server located at a remote site, and may transmit information to the mobile terminal or the server. For example, the communicator 140 may be connected to the server, and may receive dust forecast information.

The blowing fan 150 may generate a flow of air according to a drive control signal of the controller 120, may allow outdoor air (i.e., air of the indoor space R) to be suctioned into the body 10 through the air inlet 11, may filter out dirt or dust from the suctioned air through the filter unit, and may discharge purified air to the outside of the body 10 through the air outlet 12.

The blowing fan 150 may rotate by a motor (not shown), and thus may generate the flow of air. The motor may receive a control signal from the controller 120 according to a dust measurement value measured by the dust sensor 110, such that a rotation speed of the motor can be controlled based on the dust measurement value.

The blowing fan 150 may allow outdoor air (i.e., air of the indoor space R) to be suctioned into the body 10 through the air inlet 11, may filter out dirt or dust from the suctioned air through the filter unit, and may discharge purified air to the outside of the body 10 through the air outlet 12.

The display 160 may display an operation state or faulty state of the air cleaners 1 (Air Cleaner 1, Air Cleaner 2, . . . Air Cleaner N) according to a control signal of the controller 120.

The display 160 may include a display device having an input/output (I/O) function, and may be provided at a front surface of the body 10 for convenience of the user. Therefore, the display 160 may interact with the user. For example, the display 160 may receive a user input signal from the user, and may display operation information corresponding to the received user input signal.

The display 160 may include a wakeup function that is automatically activated when the user approaches any one of the air cleaners 1 within a predetermined range. For example, when the user approaches the air cleaner 1 within a predetermined range, the display 160 may be activated. In other words, the display 160 may be turned on. In contrast, when the user exits the predetermined range, the display 160 may be deactivated. That is, the display 160 may be turned off.

Operations and effects of the air cleaning system and the method for controlling the same according to the embodiment of the present disclosure will hereinafter be described.

When the air cleaners 1 (Air Cleaner 1, Air Cleaner 2, . . . Air Cleaner N) capable of communicating with one another through the communicator 140 are initially powered on, all the dust sensors 110 respectively embedded in the air cleaners 1 (Air Cleaner 1, Air Cleaner 2, . . . Air Cleaner N) are powered on, such that dust sensor information can be updated.

Therefore, the controller 120 may monitor dust sensor information of all the air cleaners 1 (Air Cleaner 1, Air Cleaner 2, . . . Air Cleaner N), and may store the monitored dust sensor information in the storage unit 130. In this case, the dust sensor information stored in the storage unit 130 may include not only dust sensor information of the corresponding air cleaner 1 (at least one of Air Cleaner 1, Air Cleaner 2, . . . Air Cleaner N), but also dust sensor information of another air cleaner 1 (at least another one of Air Cleaner 1, Air Cleaner 2, . . . Air Cleaner N). That is, the storage unit 130 may store the dust measurement value measured by the corresponding air cleaner 1 (e.g., Air Cleaner 1), and may also store another dust measurement value received from another air cleaner 1 (e.g., Air Cleaner 2, Air Cleaner 3 . . . ) through the communicator 140.

Accordingly, the controller 120 may internally systemize the dust sensor information stored in the storage unit 130, and may thus produce sensor information of all the air cleaners 1 (Air Cleaner 1, Air Cleaner 2, . . . Air Cleaner N).

For example, the respective air cleaners 1 (Air Cleaner 1, Air Cleaner 2, . . . Air Cleaner N) interconnected through communication may recognize whether another air cleaner 1 (any one of Air Cleaner 1, Air Cleaner 2, . . . Air Cleaner N) is added or deleted, and may update information of the air cleaners 1 (Air Cleaner 1, Air Cleaner 2, . . . Air Cleaner N) in real time on the basis of the recognized information.

The controller 120 may compare the dust measurement values measured by the air cleaners 1 (Air Cleaner 1, Air Cleaner 2, . . . Air Cleaner N) communicated through the communicator 140 with one another, and may thus diagnose the presence or absence of a faulty state in the dust sensors 110. A detailed description thereof will hereinafter be described with reference to FIG. 8.

Figure 8:
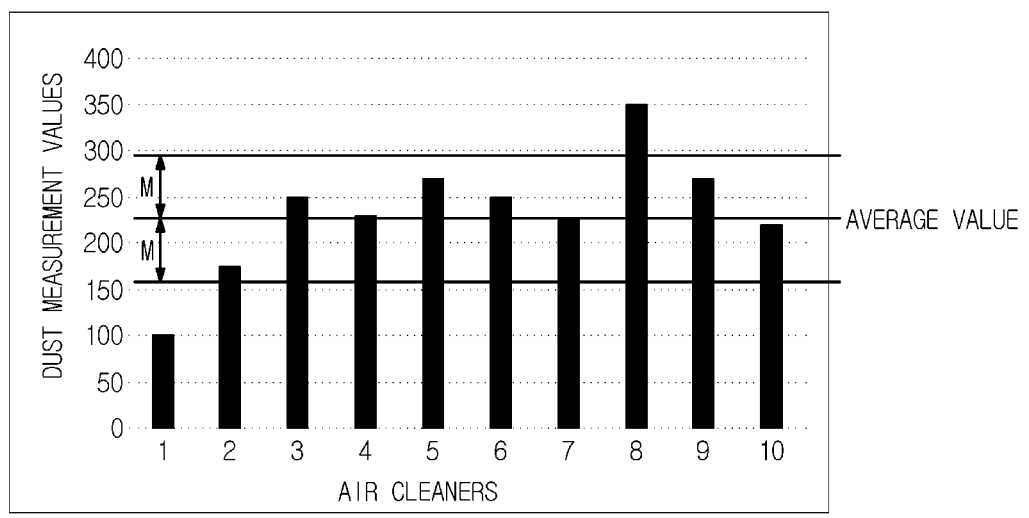
FIG. 8 is a graph illustrating dust measurement values measured in a plurality of air cleaners interoperable in the same space.

FIG. 8 is a graph illustrating dust measurement values measured in the plurality of air cleaners interoperable in the same space.

Referring to FIG. 8, the controller 120 may calculate a sensor average value of dust measurement values measured by the plurality of air cleaners 1 (e.g., Air Cleaner 1, Air Cleaner 2, . . . Air Cleaner 10), and may determine the remaining dust measurement values excepting an allowable range M (e.g., within ±25% of the sensor average value) to be a fault occurrence state.

That is, although dust measurement values measured by the plurality of air cleaners 1 (e.g., Air Cleaner 1, Air Cleaner 2, . . . Air Cleaner 10) are within the allowable range M, when the dust measurement values measured in the same space R are significantly different from a dust measurement value measured by another air cleaner 1 (any one of Air Cleaner 1, Air Cleaner 2, . . . Air Cleaner 10), the controller 120 may determine that the dust measurement value has exited a correction range in which each of the dust measurement values can be corrected to a suitable dust measurement value. When any one of the dust measurement values has exited the correction range, the controller 120 may diagnose the occurrence of a faulty state in a corresponding dust sensor 110 (i.e., a dust sensor embedded in any one of Air Cleaner 1, Air Cleaner 2, . . . Air Cleaner 10). The dust sensor 110 diagnosed as a faulty dust sensor (i.e., the dust sensor embedded in any one of Air Cleaner 1, Air Cleaner 2, . . . Air Cleaner 10) may be excluded from a master sensor selection process for linkage control of the dust sensor 110.

As can be seen from FIG. 8, because the dust measurement values of Air Cleaners 1 and 8 are faulty values, the controller 120 may diagnose that the dust sensors 110 of Air Cleaners 1 and 8 are faulty, such that the controller 120 may determine the dust sensors 110 of the remaining air cleaners 1 (Air Cleaner 2, . . . Air Cleaner 7, Air Cleaner 9, Air Cleaner 10) other than Air Cleaners 1 and 8 to be valid sensors.

The controller 120 may compare the dust measurement values of the linked air cleaners 1 (Air Cleaner 1, Air Cleaner 2, . . . Air Cleaner N) with one another, and may correct the dust measurement values according to the result of comparison.

For example, when the current dust measurement values measured by the dust sensors 110 are within the allowable range M and the other dust measurement value measured in the same space R is different from a valid sensor average value, correction processing may be carried out through the number of corrections to be acquired by the following method. A detailed description thereof will hereinafter be described with reference to FIG. 9.

Figure 9:
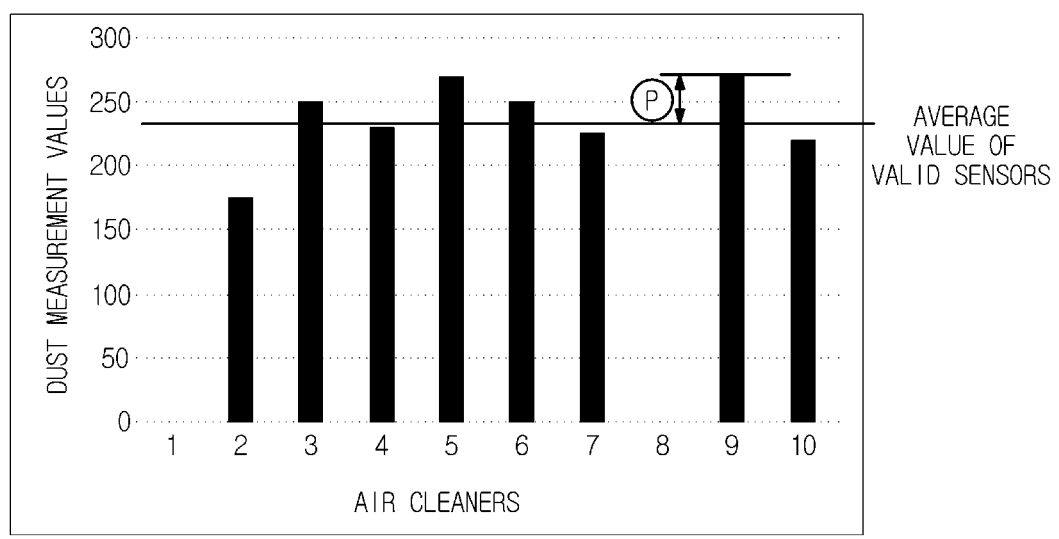
FIG. 9 is a graph illustrating correction values of the remaining dust measurement values other than a faulty value shown in FIG. 8.

FIG. 9 is a graph illustrating correction values of the remaining dust measurement values other than the faulty value shown in FIG. 8.

Referring to FIG. 9, the controller 120 may calculate an average value (i.e., an average value of dust measurement values measured by valid sensors) of the dust measurement values of the remaining air cleaners 1 (Air Cleaner 2, . . . Air Cleaner 7, Air Cleaner 9, Air Cleaner 10) other than faulty dust measurement values of Air Cleaners 1 and 8, such that the controller 120 may calculate a deviation value between the calculated valid sensor average value and the corresponding dust measurement value (i.e., a dust measurement value of each valid sensor) as a correction value using the following Equation 1.

Correction Value=Average Value of Valid Sensor−Corresponding Dust Measurement Value (Dust Measurement Value of Each Dust Sensor) [Equation 1]

For example, the correction value of Air Cleaner 9 may be denoted by 'ⓟ' (See FIG. 9).

Therefore, the correction value calculated by Equation 1 is applied to the respective dust sensor 110, such that the dust measurement value can be corrected. A detailed description thereof will hereinafter be described with reference to FIGS. 10 and 11.

Figure 10:
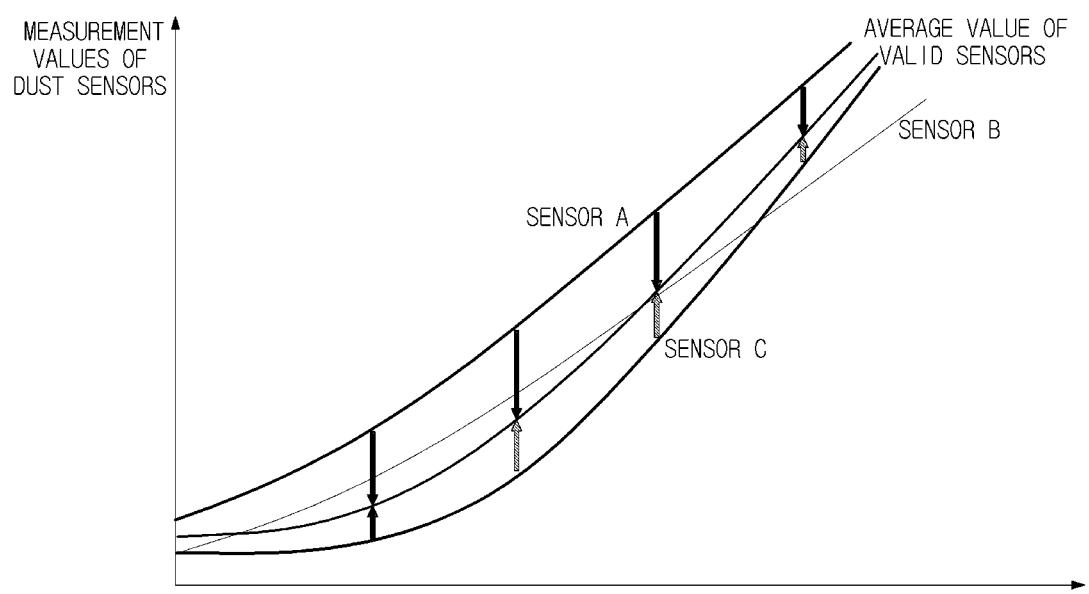
FIG. 10 is a graph illustrating a process for correcting dust measurement values shown in FIG. 9.
Figure 11:
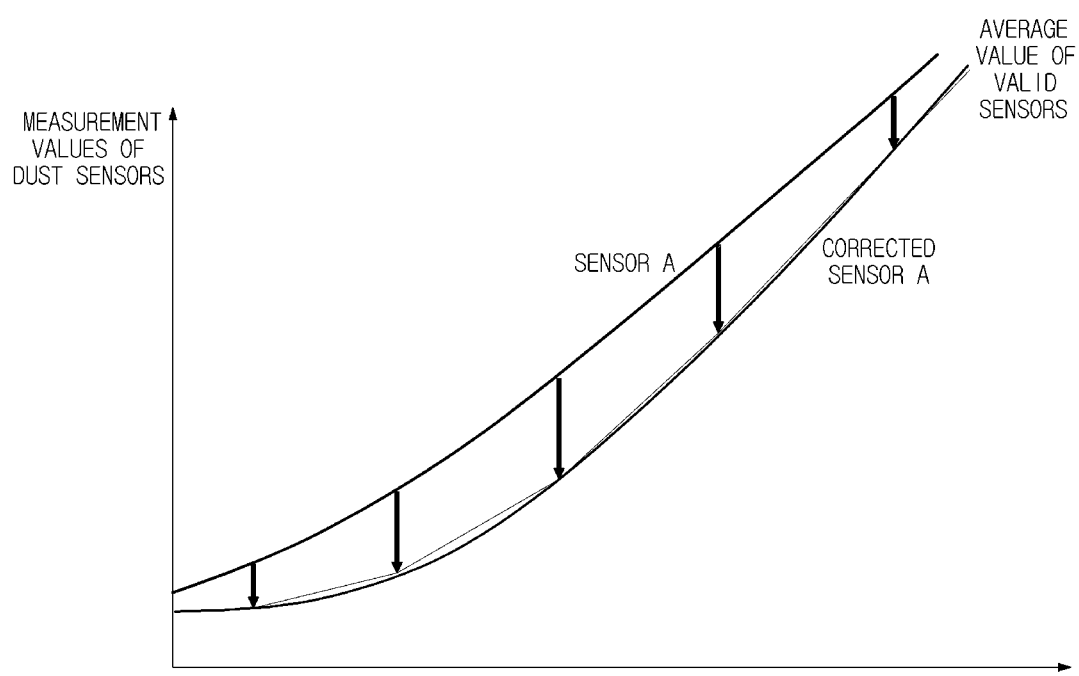
FIG. 11 is a graph illustrating dust measurement values of the corrected dust sensor A shown in FIG. 10.

FIG. 10 is a graph illustrating a process for correcting the dust measurement values shown in FIG. 9. FIG. 11 is a graph illustrating dust measurement values of the corrected dust sensor A shown in FIG. 10.

Referring to FIG. 11, an independent correction value for correcting a curve of measurement values per section on the basis of a measurement value of the master dust sensor may be applied to the respective dust sensors 110 (e.g., Sensor A, Sensor B, Sensor C). A purpose of correction in multiple sections aims to correct a measurement value acquired from each of the respective dust sensors 110 (e.g., Sensor A, Sensor B, Sensor C) to a value approximating an average value of measurement values acquired from valid sensors.

As can be seen from FIG. 11, it can be recognized that the dust measurement value of the sensor A has been corrected to a value approximating the average value (hereinafter referred to as a valid sensor average value) of measurement values acquired from valid sensors using the correction value calculated in Equation 1.

As described above, assuming that the dust measurement values acquired from the plurality of air cleaners 1 (e.g., Air Cleaner 1, Air Cleaner 2, . . . Air Cleaner 10) are corrected, accuracy of the dust sensors 110 can be improved.

The controller 120 may select a master dust sensor through linkage control of the dust sensors 110 for use in the air cleaning system 100 in which the plurality of air cleaners 1 (Air Cleaner 1, Air Cleaner 2, . . . Air Cleaner N) are configured to communicate with one another. A detailed description thereof will hereinafter be described with reference to FIG. 12.

Figure 12:
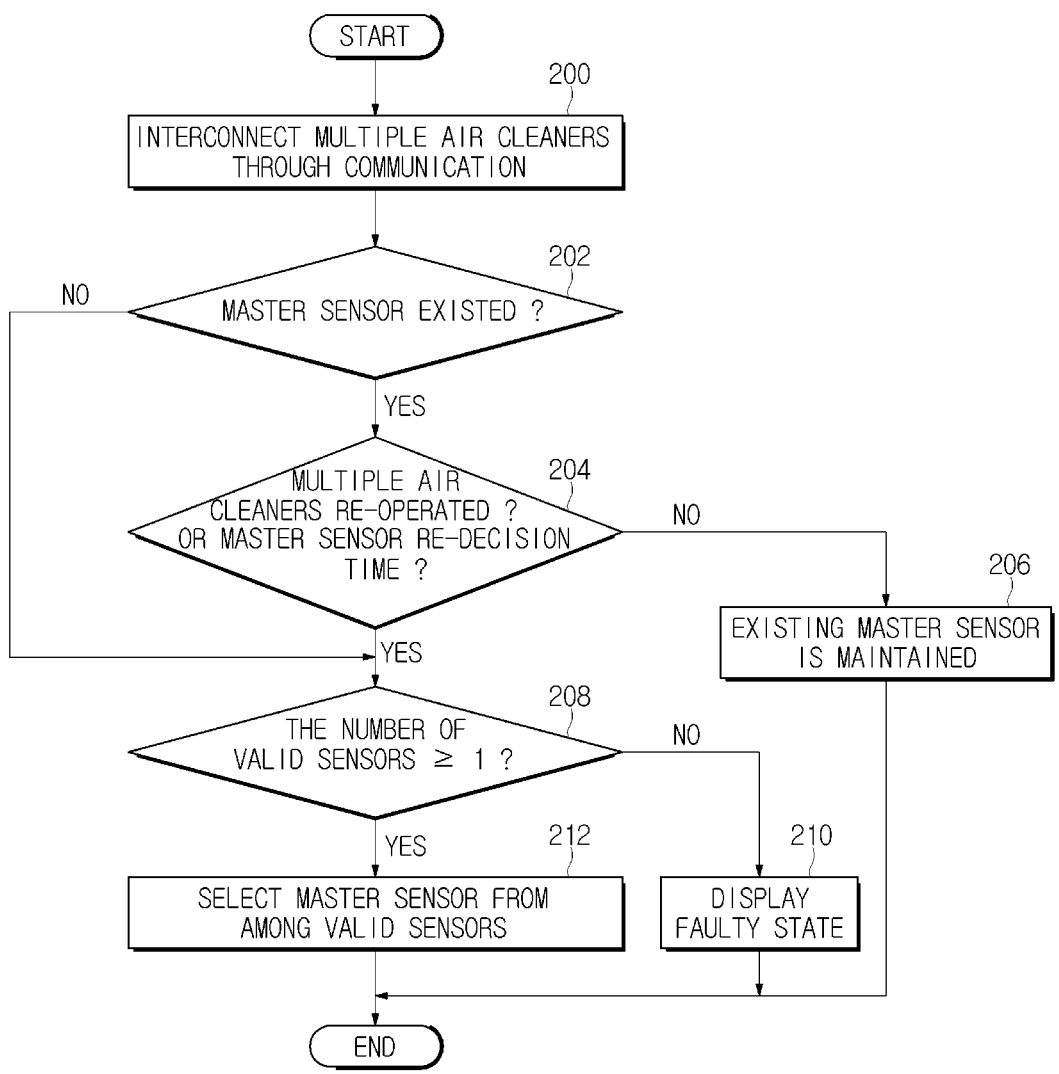
FIG. 12 is a flowchart illustrating a control algorithm for selecting a master dust sensor for use in the air cleaning system according to an embodiment of the present disclosure.

FIG. 12 is a flowchart illustrating a control algorithm for selecting a master dust sensor for use in the air cleaning system according to an embodiment of the present disclosure.

Referring to FIG. 12, when the air cleaners 1 (Air Cleaner 1, Air Cleaner 2, . . . Air Cleaner N) communicating with one another through the communicator 140 are initially powered on, the dust sensors 110 respectively embedded in the air cleaners 1 (Air Cleaner 1, Air Cleaner 2, . . . Air Cleaner N) may interact with one another, such that dust sensor information can be updated (operation 200).

Therefore, the controller 120 may determine the presence or absence of a master dust sensor in the linked dust sensors 110 (operation 202).

If the master dust sensor is present in the communication network (202), the controller 120 may determine whether the air cleaners 1 (Air Cleaner 1, Air Cleaner 2, . . . Air Cleaner N) are turned off and then restart operation or may determine whether the air cleaners 1 reach a decision time (hereinafter referred to as a master sensor re-decision time) for re-selecting a master dust sensor at intervals of a predetermined time (operation 204).

After stoppage of the air cleaners 1 (Air Cleaner 1, Air Cleaner 2, . . . Air Cleaner N), when the air cleaners 1 do not restart operation and do not reach the master sensor re-decision time (operation 204), the controller 120 may control the existing master dust sensor to remain unchanged (operation 206).

In contrast, after stoppage of the air cleaners 1 (Air Cleaner 1, Air Cleaner 2, . . . Air Cleaner N), when the air cleaners 1 restart operation or reach the master sensor re-decision time (operation 204), the controller 120 may determine whether the number of valid sensors (i.e., valid dust sensors) other than the faulty sensor (i.e., faulty dust sensor) for use in the communication network is equal to or higher than at least one as to perform master sensor re-decision processing (operation 208).

If the number of valid dust sensors is less than at least one (operation 208), the controller 120 may determine the absence of a valid dust sensor and may display a faulty state of any of the dust sensors through the display 160 (operation 210).

If the number of valid dust sensors is equal to or higher than at least one (operation 208), the controller 120 may select one dust sensor (i.e., one dust sensor having the longest lifetime) having the shortest usage time from among valid dust sensors or one dust sensor having a dust measurement value located closest to the valid sensor average value from among the plurality of valid dust sensors, and may determine the selected dust sensor to be a master dust sensor (operation 212). The controller 120 may also determine the master dust sensor according to user option setting information.

Therefore, the controller 120 may display a dust measurement value measured by the master dust sensor 110 (e.g., the dust sensor having the longest lifetime, or the dust sensor having the highest accuracy) on the displays 160 respectively embedded in the plurality of air cleaners 1. That is, the controller 120 may display the dust measurement value of the master dust sensor 110 (e.g., the dust sensor having the longest lifetime, or the dust sensor having the highest accuracy) on the display 160 of the air cleaner 1 (e.g., Air Cleaner 1) having the master dust sensor 110, may further display the dust measurement value of the master dust sensor on the displays 160 of the other air cleaners 1 (e.g., Air Cleaner 2, . . . Air Cleaner N), and may also display the same dust measurement value on the displays 160 of the air cleaners 1 (Air Cleaner 1, Air Cleaner 2, . . . Air Cleaner N) installed in the same space, such that user satisfaction can be increased and the efficiency of air cleaning can also be increased due to a more correct measurement value.

Meanwhile, when the master dust sensor is not present in the communication network (202), the controller 120 proceeds to operation 208, and performs subsequent operations starting from operation 208.

If the dust sensor to be used as a master dust sensor is selected, the controller 120 may operate all the air cleaners 1 (Air Cleaner 1, Air Cleaner 2, . . . Air Cleaner N) only using sensor information of the master dust sensor 110 (embedded in any one of Air Cleaner 1, Air Cleaner 2, . . . Air Cleaner N). A detailed description thereof will hereinafter be described with reference to FIG. 13.

Figure 13:
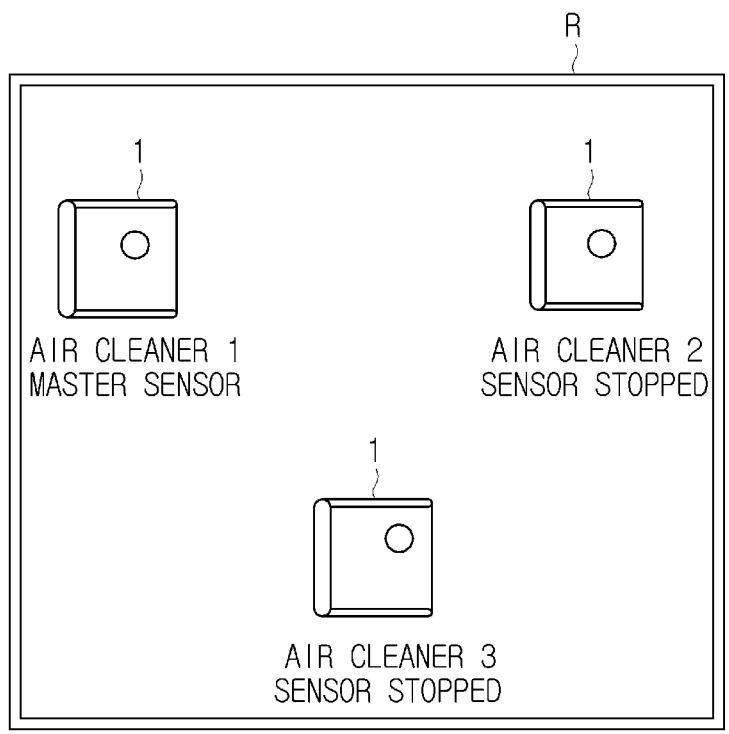
FIG. 13 is a conceptual diagram illustrating stop states of the remaining dust sensors other than a master dust sensor for use in the air cleaning system according to an embodiment of the present disclosure.

FIG. 13 is a conceptual diagram illustrating stop states of the remaining dust sensors other than the master dust sensor for use in the air cleaning system according to an embodiment of the present disclosure.

Referring to FIG. 13, if the master dust sensor (e.g., the dust sensor of Air Cleaner 1) is selected, the controller 120 may operate the plurality of air cleaners 1 (Air Cleaner 1, Air Cleaner 2, . . . Air Cleaner N) using only the sensor information of the master dust sensor 110 (i.e., the dust sensor of Air Cleaner 1).

Therefore, the remaining dust sensors (e.g., the dust sensor of Air Cleaner 2 and the dust sensor of Air Cleaner 3) other than the master dust sensor stop operation or are powered off until reaching the master sensor re-decision time, so that noise produced by the fans embedded in the dust sensors (e.g., the dust sensor of Air Cleaner 2 and the dust sensor of Air Cleaner 3) can be reduced and power consumption can also be reduced, resulting in an increased lifetime of the stopped dust sensors (e.g., the dust sensor of Air Cleaner 2 and the dust sensor of Air Cleaner 3).

If any one of the dust sensors 110 (i.e., a dust sensor embedded in any one of Air Cleaner 1, Air Cleaner 2, . . . Air Cleaner N) for use in the air cleaning system 100 (Air Cleaner 1, Air Cleaner 2, . . . Air Cleaner N) normally operates, the controller 120 may normally operate all the air cleaners 1 (Air Cleaner 1, Air Cleaner 2, . . . Air Cleaner N). A detailed description thereof will hereinafter be described with reference to FIG. 14.

Figure 14:
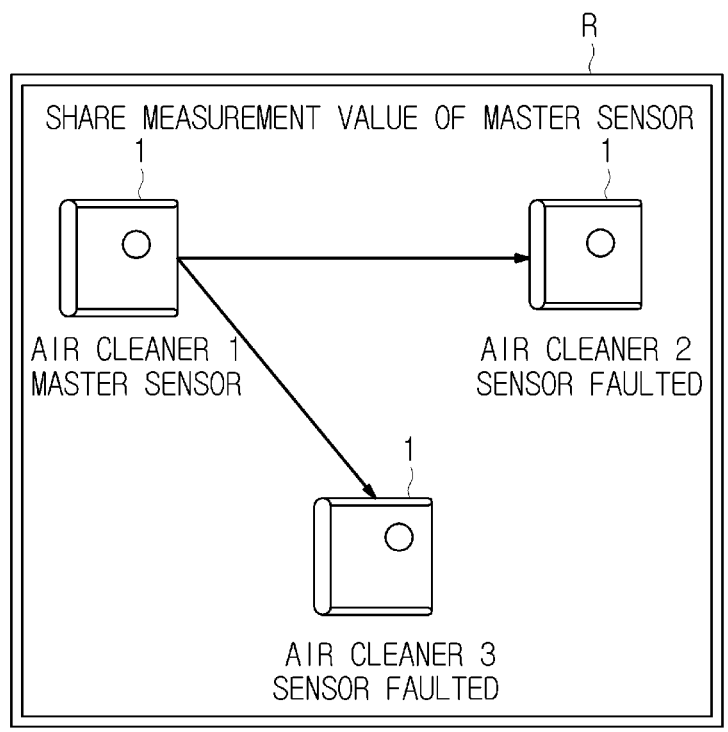
FIG. 14 is a conceptual diagram illustrating faulty states of the remaining dust sensors other than only one dust sensor according to an embodiment of the present disclosure.

FIG. 14 is a conceptual diagram illustrating faulty states of the remaining dust sensors other than only one dust sensor according to an embodiment of the present disclosure.

Referring to FIG. 14, if any one 110 (e.g., the dust sensor of Air Cleaner 1) of the dust sensors embedded in the plurality of air cleaners 1 (Air Cleaner 1, Air Cleaner 2, Air Cleaner 3) communicating with one another normally operates, the controller 120 may determine the corresponding dust sensor 110 (e.g., the dust sensor of Air Cleaner 1) to be a master dust sensor.

Therefore, the controller 120 may normally operate all the air cleaners 1 (Air Cleaner 1, Air Cleaner 2, Air Cleaner 3) communicating with one another on the basis of the dust measurement value of the corresponding dust sensor 110 (i.e., the dust sensor of Air Cleaner 1) selected as a master dust sensor (e.g., the dust sensor of Air Cleaner 1).

Therefore, although any one of the dust sensor 110 (any one of the dust sensors of Air Cleaner 1, Air Cleaner 2, and Air Cleaner 3) communicating with one another has a faulty state, the controller 120 may normally operate the faulty air cleaner 1 (any one of Air Cleaner 1, Air Cleaner 2, and Air Cleaner 3) using the dust sensor 110 (i.e., the dust sensor embedded in any one of Air Cleaner 1, Air Cleaner 2, and Air Cleaner 3) of the other air cleaner 1 (i.e., the other one of Air Cleaner 1, Air Cleaner 2, and Air Cleaner 3) connected through communication.

The controller 120 may correspond to a dust occurrence event using the learning (AI; Artificial Intelligence) function, and may recognize the presence or absence of a faulty operation in the dust sensor 110. A detailed description thereof will hereinafter be described with reference to FIGS. 15 and 16.

Figure 15:
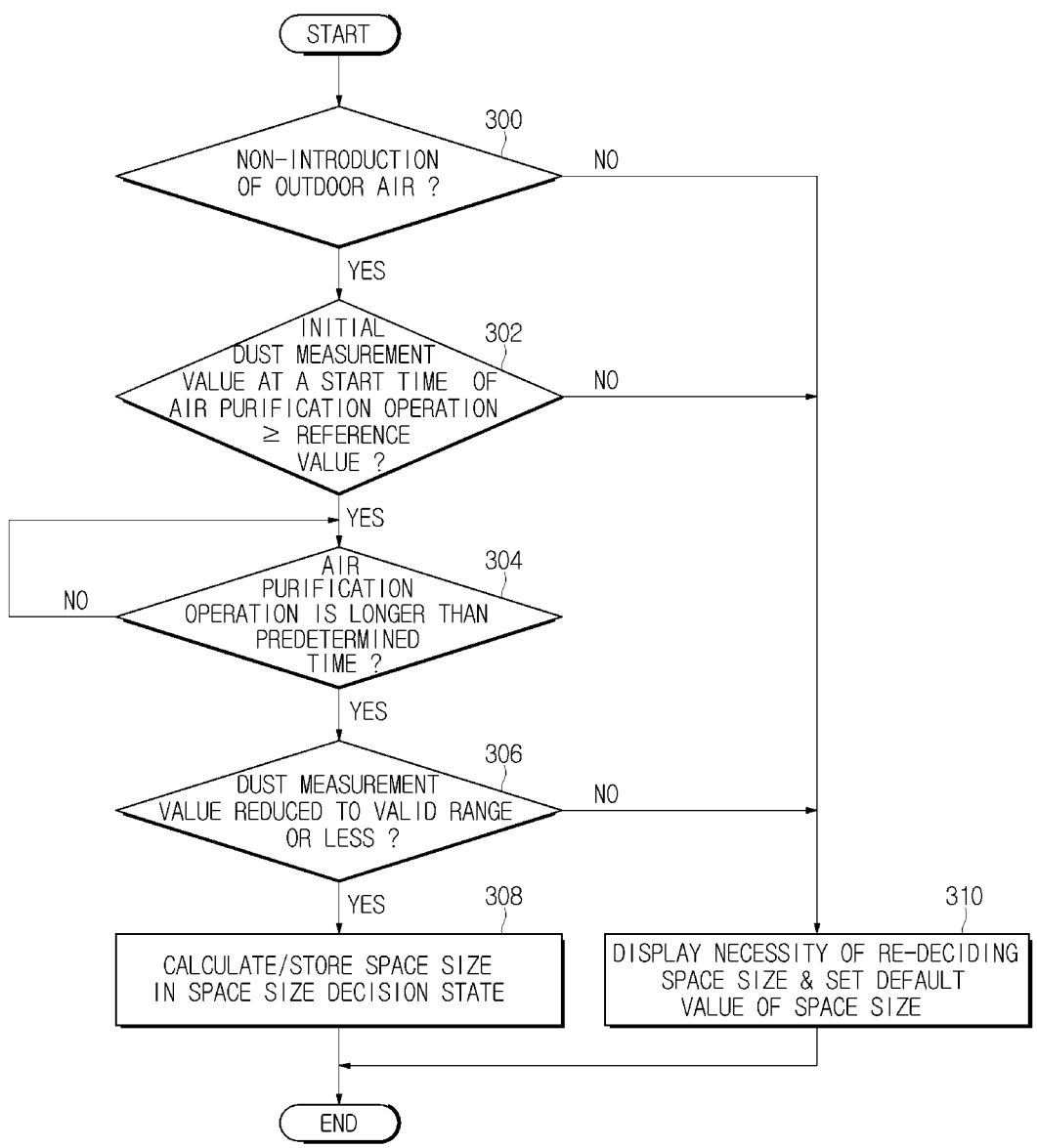
FIG. 15 is a flowchart illustrating a control algorithm for recognizing the size of an indoor space including the air cleaning system according to an embodiment of the present disclosure.

FIG. 15 is a flowchart illustrating a control algorithm for recognizing the size of an indoor space including the air cleaning system according to an embodiment of the present disclosure.

Referring to FIG. 15, in order to recognize the size of the indoor space R including the currently-grouped air cleaners 1 (Air Cleaner 1, Air Cleaner 2, . . . Air Cleaner N), the user may instruct a space recognition operation, and the controller 120 may recognize the size of the indoor space R through learning (AI) of both the entire capacity of the grouped air cleaners 1 (Air Cleaner 1, Air Cleaner 2, Air Cleaner, . . . Air Cleaner N) and the change of air purification level of the indoor space R.

In FIG. 15, the controller 120 may determine the presence or absence of outdoor air introduced into the indoor space R (operation 300). In more detail, the reason why the controller 120 determines the presence or absence of outdoor air introduced into the indoor space R is to recognize the size of the indoor space R including the currently-grouped air cleaners 1 (Air Cleaner 1, Air Cleaner 2, Air Cleaner, . . . Air Cleaner N) on the condition that outdoor air is not introduced to restrict the environmental condition of the indoor space R.

If outdoor air is not introduced (operation 300) and the air purification operation mode for recognizing the size of the space begins, the controller 120 may determine whether an initial dust measurement value measured by the dust sensor 110 is equal to or higher than a reference value (i.e., a predetermined amount of dust (approximately 50 or higher) indicating the presence of dust in the indoor space) (operation 302).

If the initial dust measurement value is equal to or higher than the reference value (operation 302), the controller 120 may determine whether the air purification operating time has elapsed by a predetermined time (approximately 10 minutes) (operation 304). In this case, during the predetermined time (approximately 10 minutes), the controller 120 may measure whether the dust measurement value has been reduced to a valid range or less according to the air purification operation mode, such that the controller 120 may determine introduction or non-introduction of outdoor air.

If the air purification operation time has elapsed by the predetermined time (operation 304), the controller 120 may determine whether the dust measurement value measured by the dust sensor 110 has been reduced to a valid range or less (operation 306). In other words, if the air purification operation corresponding to the predetermined time is executed in the indoor space R in which outdoor air is not introduced, the dust measurement value is reduced to the valid range. Therefore, the air purification operation corresponding to the predetermined time is performed, the controller 120 may determine whether the dust measurement value has been reduced to the valid range, and may thus recognize introduction or non-introduction of outdoor air.

If the dust measurement value has been reduced to the valid range (operation 306), the controller 120 may decide a normal state in which the size of the purification space of the indoor space R can be recognized, may calculate the size of the purification space using the following equation 2, and may store the calculated size of the purification space in the storage unit 130 (operation 308).

$$\text{Size of Purification Space} = ((\text{Dust Measurement Value after lapse of 10 minutes})/(\text{Initial Dust Measurement Value})) \times (\text{Total number of purification areas, each of which has 3.3 m}^2\text{, of the currently-grouped air cleaners}) \times \text{Constant} \quad [\text{Equation 2}]$$

In Equation 2, a value of the constant may be '2'.

As can be seen from Equation 2, the controller 120 may measure the speed of reduction of air purification in the indoor space R, and may determine the size of the space compared to the capacity of the corresponding air cleaner 1 (any one of Air Cleaner 1, Air Cleaner 2, and Air Cleaner 3).

If no dust is present in the indoor space, the predetermined amount of dust may be introduced into the indoor space, and a preset test may then be carried out in the indoor space.

Therefore, the controller 120 may calculate the amount of air purification (i.e., air-purification capacity) of the currently-grouped dust sensors 110 on the basis of the space size calculated by Equation 2, and may decide a grace period (Ts) of event occurrence on the basis of the calculated amount of air purification, as represented by the following equation 3.

$$\text{Grace Period (Ts)} = (\text{Size of Purification Space})/(\text{Total number of purification areas, each of which has 3.3 m}^2\text{, of the currently-grouped air cleaners}) \times 5 \text{ minutes} \quad [\text{Equation 3}]$$

The grace time (Ts) of event occurrence may be re-calculated in real time when the number of grouped dust sensors 110 is changed.

Although the dust measurement values of some dust sensors 110 (dust sensors embedded in any one of Air Cleaner 1, Air Cleaner 2, . . . Air Cleaner N) of the grouped air cleaners 1 (Air Cleaner 1, Air Cleaner 2, . . . Air Cleaner N) are largely changed, the corresponding dust measurement values may be reflected into the total average value within the grace period (Ts) of event occurrence. A detailed description thereof will hereinafter be described with reference to FIG. 16.

If introduction of outdoor air is decided (operation 300), the controller 120 may determine occurrence of a measurement error state in which the size of the indoor space R cannot be recognized, may display an alarm message indicating that the space size needs to be re-decided, and may set the space size to a default value (operation 310). In this case, the default value may be set to 1.2 times the total number of purification areas, each of which has 3.3 m², of the grouped air cleaners.

If the initial dust measurement value is not equal to or higher than the reference value (operation 302), the controller 120 proceeds to operation 310, and performs subsequent operations starting from operation 310.

If the dust measurement value is not reduced to the valid range (operation 306), the controller 120 may decide occurrence of a measurement error rate in which the size of the indoor space R cannot be recognized, the controller 120 proceeds to operation 310, and performs subsequent operations starting from operation 310.

If the faulty or normal state of some dust sensors is repeatedly decided, the controller 120 may decide the presence of errors in the operation mode for recognizing the space size, and may display a notification message indicating the necessity of re-deciding the space size on the display 160 for user recognition.

Figure 16:
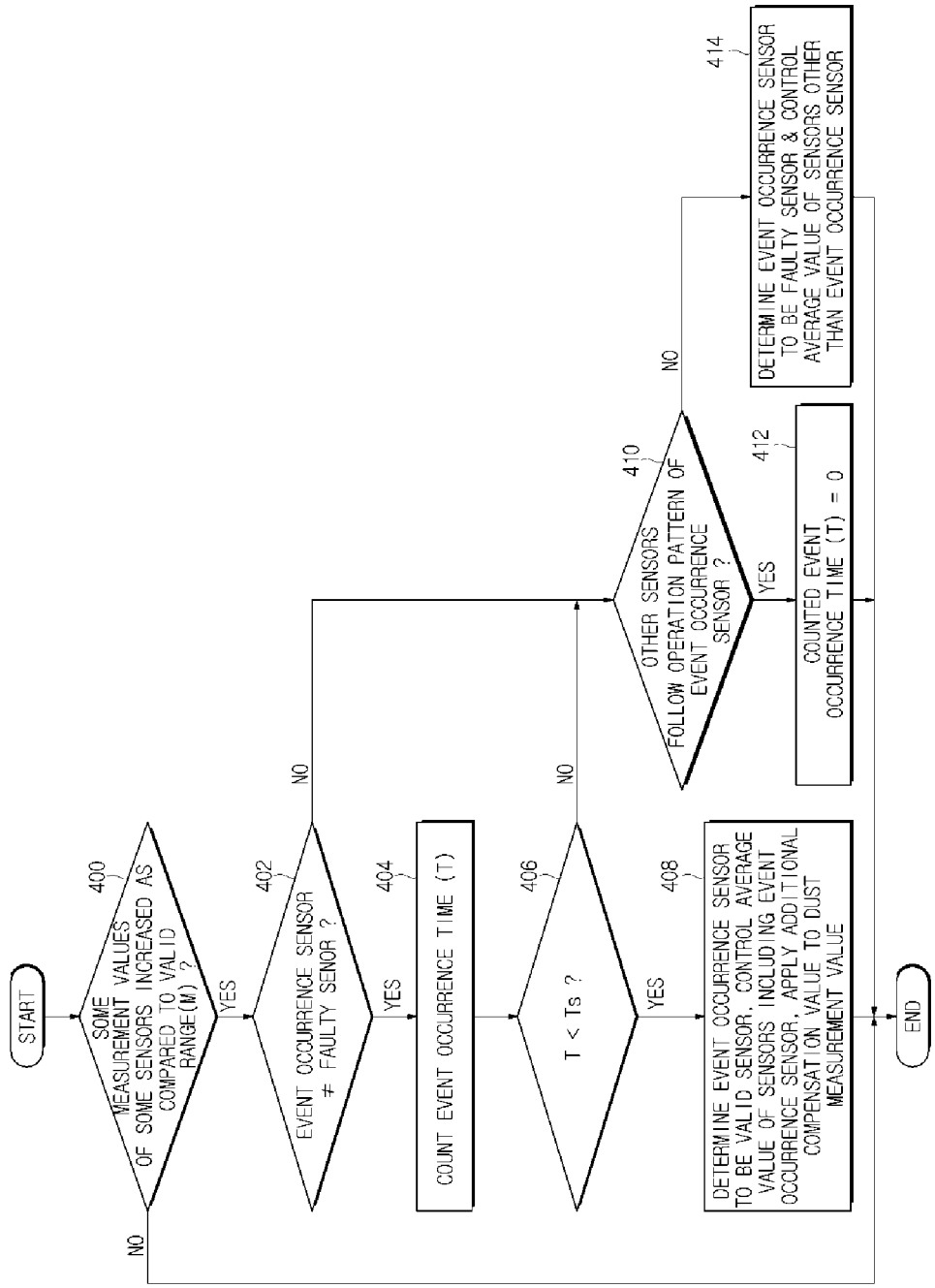
FIG. 16 is a flowchart illustrating a control algorithm for determining a grace period for event occurrence in the air cleaning system according to an embodiment of the present disclosure.

FIG. 16 is a flowchart illustrating a control algorithm for determining a grace period for event occurrence in the air cleaning system according to an embodiment of the present disclosure.

Referring to FIG. 16, if the dust measurement value is largely increased at some positions within the indoor space R in which the currently-grouped air cleaners (Air Cleaner 1, Air Cleaner 2, . . . Air Cleaner N) are installed, the controller 120 may predict the event of dust occurrence through the learning (AI) function, and may increase the amount of air purification prior to the spread of dust in the indoor space R, such that the controller 120 can reduce the amount of dust in advance.

Referring to FIG. 16, the controller 120 may determine whether some dust measurement values of some dust sensors 110 have been increased as compared to a valid range M of average values (hereinafter referred to as an average-value valid range M) (400).

If some dust measurement values are increased as compared to the average-value valid range M (operation 400), the controller 120 may determine occurrence of the dust occurrence event, and may determine whether the event occurrence sensor is not determined to be a faulty dust sensor (operation 402).

If the event occurrence sensor is not determined to be the faulty dust sensor (operation 402), the controller 120 may count an event occurrence time (T) (operation 404).

Subsequently, the controller 120 may compare the counted event occurrence time (T) with the grace period (Ts) of the event occurrence, and may determine whether the event occurrence time (T) is shorter than the event occurrence grace period (Ts) (operation 406).

If the event occurrence time (T) is shorter than the event occurrence grace period (Ts) (operation 406), the controller 120 may determine the event occurrence sensor to be a valid sensor, and may control the air cleaning system using the average value of sensors including the event occurrence sensor. Although the dust measurement values of some dust sensors from among all the dust sensors of the grouped air cleaners 1 (Air Cleaner 1, Air Cleaner 2, . . . Air Cleaner N) are largely changed, the dust measurement value of the corresponding dust sensor (i.e., the event occurrence sensor) can be reflected into a total average value within the event occurrence grace time (Ts).

The controller 120 may apply an additional compensation value (ΔX) to the dust measurement values of all the dust sensors 110 (operation 408). Therefore, the dust measurement values measured by the other dust sensors 110 may be recognized as high dust measurement values higher than the actual dust measurement values. In this case, the reason why the additional compensation value (ΔX) is applied to the dust measurement values of all the dust sensors 110 is to prevent increase of the amount of dust in the indoor space R through pre-reflection of a prediction value because the increasing amount of dust in the indoor space R is predicted during the event occurrence grace time (Ts).

The controller 120 may decide whether the event occurs, and may control the amount of dust by applying the additional compensation value (ΔX) to the dust measurement values of all the dust sensors 110 according to the decision result. If the event by which the amount of actual dust increases occurs, the event occurrence sensor may not correct the corresponding dust measurement value. In addition, the amount of dust to which the additional compensation value (ΔX) is applied during occurrence of the actual event may be shared with other dust sensors 110.

Conventionally, when the increasing amount of dust is measured by the other dust sensors 110 due to the presence of dust spread out in the indoor space R, the amount of purified air is then increased. The conventional art is designed to increase the amount of purified air on the condition that the dust is spread out in the indoor space R, such that a long period of time is consumed to improve the air quality of the indoor space R, resulting in user's unpleasant feeling.

In contrast, the present disclosure may estimate the increasing amount of dust using the learning (AI) function, and may increase the amount of purified air before the dust is spread out in the indoor space R, such that the amount of dust can be reduced in advance. Therefore, the air quality of the indoor space R can be improved within a short time, and more pleasant indoor air can be provided to users who stay in the indoor space R.

If the event occurrence sensor is not identical to a faulty dust sensor (operation 402), i.e., if the event occurrence sensor is a faulty dust sensor, the controller 120 may determine whether the other dust sensors 110 follow the operation pattern of the event occurrence sensor (operation 410).

If the event occurrence time (T) is not shorter than the event occurrence grace time (Ts) (406), the controller 120 proceeds to operation 410, and performs subsequent operations starting from operation 410.

If the other dust sensors 110 follow the operation pattern of the event occurrence sensor (operation 410), the controller 120 may clear the counted event occurrence time (T) to be zero '0' (operation 412).

If the other dust sensors 110 do not follow the operation pattern of the event occurrence sensor (410), the controller 120 may determine the event occurrence sensor to be a faulty dust sensor, may process the event occurrence sensor corresponding to the faulty dust sensor, and may control the air cleaning system using the average value of the remaining dust sensors other than the event occurrence sensor (operation 414).

The controller 120 may correct the dust measurement value by interacting with the dust forecast. A detailed description thereof will hereinafter be described with reference to FIG. 17.

Figure 17:
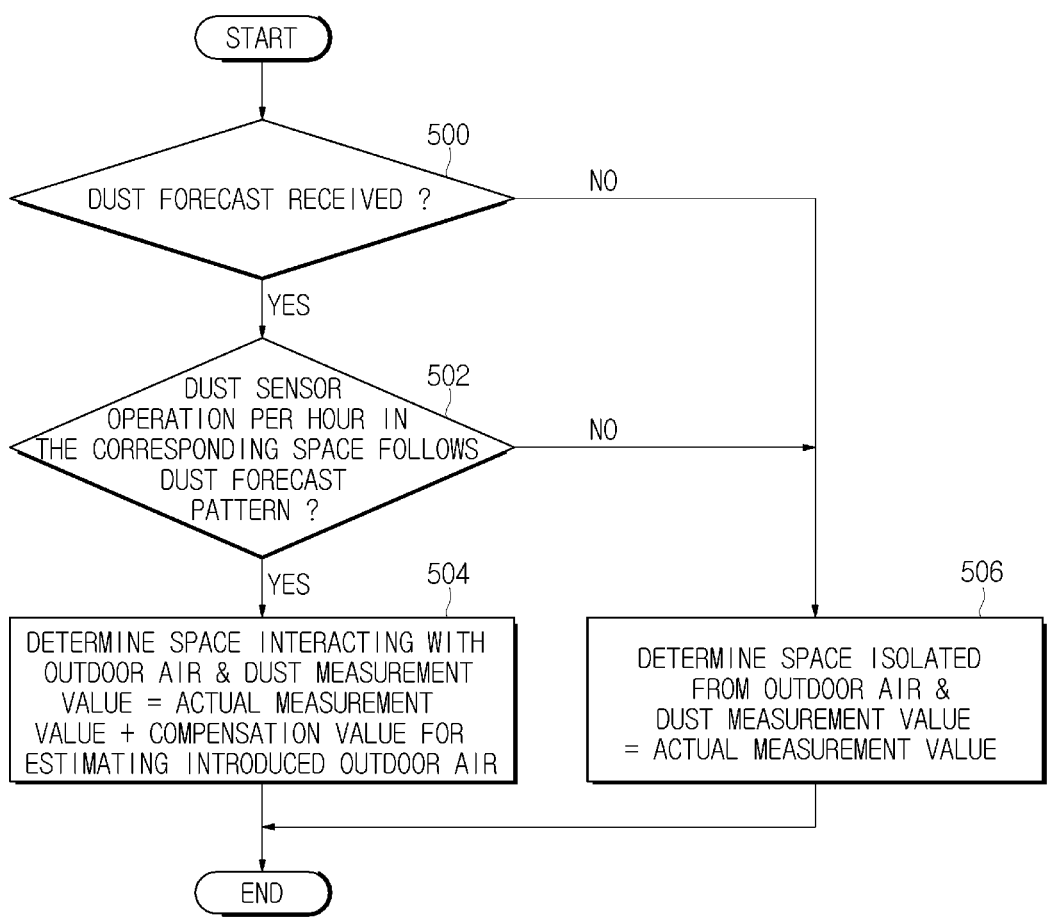
FIG. 17 is a flowchart illustrating a control algorithm for correcting dust measurement values through linkage control of dust forecasts in the air cleaning system according to an embodiment of the present disclosure.

FIG. 17 is a flowchart illustrating a control algorithm for correcting dust measurement values through linkage control of dust forecasts in the air cleaning system according to an embodiment of the present disclosure.

Referring to FIG. 17, the controller 120 may determine whether the air cleaning system receives dust forecast data from an external server (operation 500).

If the air cleaning system stays in the state of dust forecast reception (operation 500), the controller 120 may determine whether the dust sensor operation per hour in the indoor space R follows the dust forecast pattern (operation 502).

If the dust sensor operations follow the dust forecast pattern (operation 502), the controller 120 may determine that outdoor air has been introduced into the indoor space R due to the opening of any window or door, and may calculate the dust measurement value according to the dust forecast using the following equation 4 (operation 504).

Dust Measurement Value=Actual Measurement Value+Compensation Value for estimating Introduced Outdoor Air    [Equation 4]

Prior to increasing the dust measurement value of the indoor space R according to the dust forecast, "Actual Measurement Value+Compensation Value for estimating Introduced Outdoor Air" is pre-reflected in the degree of air purification and the amount of purified air increases, such that the spread of dust in the indoor space can be actively prevented.

If the air cleaning system does not stay in the state of dust forecast reception (operation 500), the controller 120 may determine that the indoor space R is isolated from outdoor air, the dust measurement value is applied to the actual measurement values of the dust sensors 110, such that the controller 120 may thus control the air cleaning system using the resultant measurement values (operation 506).

The controller 120 may group the dust sensors 110 respectively embedded in the air cleaners 1 (Air Cleaner 1, Air Cleaner 2, . . . Air Cleaner N), and may perform linkage control of the grouped dust sensors 110.

The air cleaners 1 (Air Cleaner 1, Air Cleaner 2, . . . Air Cleaner N) installed in the indoor space R may be automatically used to control average values using the algorithm for controlling the average values of the dust sensors 110. However, assuming that at least one (i.e., at least one of Air Cleaner 1, Air Cleaner 2, . . . Air Cleaner N) of the air cleaners 1 (Air Cleaner 1, Air Cleaner 2, . . . Air Cleaner N) exists in another isolated space located close to the corresponding air cleaner, the dust measurement values caused by wrong grouping of the air cleaners may cause unexpected operations or errors.

Grouping of the dust sensors 110 may be constructed according to the networking distance between the air cleaners 1 (Air Cleaner 1, Air Cleaner 2, . . . Air Cleaner N) in so far as the user does not intentionally designate such grouping of the dust sensors 110. In the wireless communication network, the arrival range of the corresponding wireless communication may be used as the range of grouping. In this case, some dust sensors 110 contained in the group regardless of user's intention may be automatically excluded from average value control when the corresponding dust sensors 110 do not satisfy conformability in operation pattern during the average value control.

The user may perform fixed grouping of the respective air cleaners 1 (Air Cleaner 1, Air Cleaner 2, . . . Air Cleaner N) through a manual operation. In more detail, in short range communication (WiFi, BLE, IR, Zigbee, etc.), the user may directly allocate information of a specific group and may fix the allocated information, or may perform grouping of the air cleaners 1 by manually pairing the air cleaners 1 (Air Cleaner 1, Air Cleaner 2, . . . Air Cleaner N). In this case, when the respective air cleaners 1 (Air Cleaner 1, Air Cleaner 2, . . . Air Cleaner N) belong to the integrated communication range, the dust sensors 110 are combined with one another in the corresponding group and then controlled. When the respective air cleaners 1 exit the integrated communication range, the dust sensors 110 may operate independently from one another.

Meanwhile, although the embodiment of the present disclosure has exemplarily disclosed that the dust sensors 110 respectively embedded in the air cleaners 1 (Air Cleaner 1, Air Cleaner 2, . . . Air Cleaner N) interact with one another for convenience of description, the scope or spirit of the present disclosure is not limited thereto, it should be noted that linkage control of the dust sensors can also be implemented between the air cleaners 1 and other devices (e.g., the air conditioner having at least one dust sensor). A detailed description thereof will hereinafter be described with reference to FIG. 18.

Figure 18:
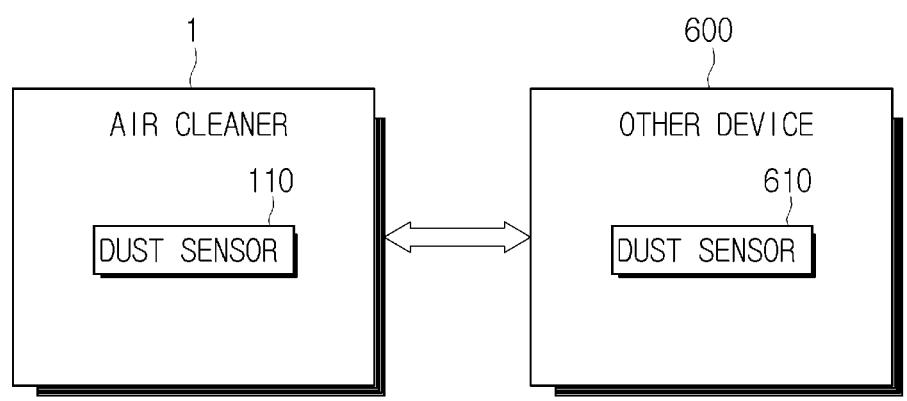
FIG. 18 is a conceptual diagram illustrating linkage control between the air cleaner and another device according to an embodiment of the present disclosure.

FIG. 18 is a conceptual diagram illustrating linkage control between the air cleaner and another device according to an embodiment of the present disclosure.

Referring to FIG. 18, the air cleaner 1 having the dust sensor 110 and the other device 600 (for example, the air conditioner) including a dust sensor 610 may be installed in the same indoor space, or may be installed in different indoor spaces.

The air cleaner 1 and the other device 600 may perform integrated control of the dust sensors 110 and 610, such that the air cleaner 1 and the other device 600 may correct errors between the dust sensors 110 and 610 while simultaneously sequentially controlling the respective dust sensors 110 and 610 through linkage control thereof. As a result, it is obvious to those skilled in the art that the same purpose and effects as those of the present disclosure can also be implemented using linkage control of the air cleaner and the other device without departing from the scope or spirit of the present disclosure.

As is apparent from the above description, the air cleaning system and the method for controlling the same according to the embodiments of the present disclosure may improve accuracy of dust sensors through linkage control of the dust sensors, and even when any one of the dust sensors fails to operate may normally operate an air cleaner corresponding to the faulty dust sensor by using dust sensors of the remaining communicating air cleaners other than the faulty air cleaner.

The air cleaning system and the method for controlling the same according to the embodiments may select a master dust sensor through linkage control of the dust sensors, and may operate the plurality of air cleaners only using sensor information of the master dust sensor. Therefore, the air cleaning system may stop operation of the remaining dust sensors other than the master dust sensor, may reduce not only measurement noise produced by the dust sensors but also power consumption, and may increase a lifetime of the dust sensors.

The air cleaning system may predict an event of dust occurrence at some positions in indoor spaces through linkage control of the dust sensors, and may perform a learning (AI) function for increasing the amount of air cleaning prior to spread of dust in indoor spaces. In addition, the air cleaning system may recognize the presence or absence of a faulty operation of any of the dust sensors using the learning (AI) function.

The air cleaning system may actively prevent the spread of dust in indoor spaces on the basis of a dust forecast through linkage control of the dust sensors.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An air cleaning system comprising:
    a first air cleaner including:
        a first dust sensor configured to measure a first degree of air pollution at the first air cleaner,
        a first communicator configured to transmit information about the first dust sensor including the measured first degree of air pollution, and
        a first controller configured to control the first air cleaner; and
    a second air cleaner including:
        a second dust sensor configured to measure a second degree of air pollution at the second air cleaner,
        a second communicator configured to transmit information about the second dust sensor including the measured second degree of air pollution; and
        a second controller configured to control the second air cleaner, wherein the first controller is further configured to control the first air cleaner based on information about the second dust sensor.

2. The air cleaning system according to claim 1, wherein the first controller is configured to control the first air cleaner based on the measured second degree of air pollution.

3. The air cleaning system according to claim 2, wherein the first controller is further configured to determine whether at least one of the first dust sensor and the second dust sensor is in a faulty state based on the measured first degree of air pollution and the measured second degree of air pollution.

4. The air cleaning system according to claim 3, wherein the first controller is further configured to calculate a sensor average value of the measured first degree of air pollution and the measured second degree of air pollution, and determines whether the at least one of the first dust sensor and the second dust sensor is in a faulty state by determining whether the measured first degree of air pollution and the measured second degree of air pollution are within an allowable range (M) from the sensor average value.

5. The air cleaning system according to claim 4, wherein the first controller is further configured to calculate a valid sensor average value that excludes an air pollution measurement value of the at least one of the first dust sensor and the second dust sensor determined to be faulty, and apply a deviation between the valid sensor average value and an air pollution measurement value of each of the at least one of the first dust sensor and the second dust sensor determined not to be faulty to correct the air pollution measurement value of at least one of the first dust sensor and the second dust sensor determined to be faulty.

6. The air cleaning system according to claim 5, wherein the first controller is further configured to select a sensor among the first dust sensor and the second dust sensor having a shortest usage time or an air pollution measurement value located closest to the valid sensor average value as a master sensor.

7. The air cleaning system according to claim 6, wherein each of the first controller and the second controller is further configured to stop an operation of dust sensors among the first dust sensor and the second dust sensor other than the master sensor, and control each of the first air cleaner and the second air cleaner using only the air pollution measurement value of the master sensor among the measured first degree of air pollution and the measured second degree of air pollution.

8. The air cleaning system according to claim 3, wherein: when any one of the first dust sensor and the second dust sensor normally operates, the first controller is configured to select the corresponding dust sensor as the master sensor, and operate the first air cleaner using the master sensor.

9. The air cleaning system according to claim 4, wherein the first controller is further configured to:
determine the size of an indoor space including the first air cleaner,
estimate a dust occurrence event based on the determined size of the indoor space, and
increase an air cleaning operation of the first air cleaner based on the estimated dust occurrence event.

10. The air cleaning system according to claim 9, wherein the first controller is further configured to determine the size of the indoor space using an initial air pollution measurement value in a controlled clean-air state of the indoor space, and an air pollution measurement value after a predetermined time has elapsed from an acquisition time of the initial air pollution measurement value.

11. The air cleaning system according to claim 10, wherein the first controller is further configured to increase the air cleaning operation of the first air cleaner based on the estimated dust occurrence event using air pollution measurement values higher than the measured first degree of air pollution and the measured second degree of air pollution.

12. The air cleaning system according to claim 2, wherein the first controller is further configured to:
receive dust forecast data from an external server,
compare the received dust forecast data with a variance of the measured first degree of air pollution and the measured second degree of air pollution, and
determine whether an indoor space is open to another space.

13. The air cleaning system according to claim 12, wherein:
when the indoor space is determined to be open to another space, the first controller is configured to increase the air cleaning operation of the first air cleaner by adding a compensation value to the measured first degree of air pollution and the measured second degree of air pollution.

* * * * *